(12) United States Patent
Yang

(10) Patent No.: US 12,133,127 B2
(45) Date of Patent: Oct. 29, 2024

(54) CELL HANDOVER METHOD AND APPARATUS

(71) Applicant: BEIJING XIAOMI MOBILE SOFTWARE CO., LTD., Beijing (CN)

(72) Inventor: Xing Yang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 358 days.

(21) Appl. No.: 17/535,219

(22) Filed: Nov. 24, 2021

(65) Prior Publication Data

US 2022/0086727 A1  Mar. 17, 2022

Related U.S. Application Data

(63) Continuation of application No. PCT/CN2019/088655, filed on May 27, 2019.

(51) Int. Cl.
*H04W 4/00* (2018.01)
*H04W 36/00* (2009.01)

(52) U.S. Cl.
CPC ... *H04W 36/0079* (2018.08); *H04W 36/0077* (2013.01)

(58) Field of Classification Search
CPC ............. H04W 36/0079; H04W 36/08; H04W 36/0085
See application file for complete search history.

(56) References Cited

U.S. PATENT DOCUMENTS

| | | | | |
|---|---|---|---|---|
| 11,490,303 B2 * | 11/2022 | Hao | ................ | H04W 36/00837 |
| 11,523,313 B2 * | 12/2022 | Latheef | ........... | H04W 36/00837 |
| 11,832,141 B2 * | 11/2023 | Kim | .................... | H04W 36/305 |
| 2007/0275723 A1 * | 11/2007 | Jeong | ................ | H04W 56/0005 |
| | | | | 455/436 |
| 2011/0286433 A1 * | 11/2011 | Xiao | ................. | H04W 36/0033 |
| | | | | 370/331 |
| 2016/0080997 A1 * | 3/2016 | Hu | ......... | H04W 36/16 |
| | | | | 455/442 |
| 2017/0164265 A1 * | 6/2017 | Dai | ..................... | H04L 61/5007 |
| 2018/0020382 A1 * | 1/2018 | Kim | .................. | H04W 36/0064 |
| 2019/0116541 A1 * | 4/2019 | Hong | .................... | H04W 36/36 |
| 2019/0174373 A1 * | 6/2019 | Kanazawa | ........ | H04W 36/0085 |
| 2020/0314664 A1 * | 10/2020 | Zhou | ..................... | H04L 5/0023 |
| 2021/0068016 A1 * | 3/2021 | Shi | ........................ | H04W 36/08 |
| 2021/0297909 A1 * | 9/2021 | Lee | .................... | H04W 36/0061 |
| 2021/0345213 A1 * | 11/2021 | Kim | .................. | H04W 74/0841 |
| 2021/0410034 A1 * | 12/2021 | You | ..................... | H04W 76/38 |

FOREIGN PATENT DOCUMENTS

| | | |
|---|---|---|
| CN | 101489273 A | 7/2009 |
| CN | 102257852 A | 11/2011 |

OTHER PUBLICATIONS

PCT/CN2019/088655 English translation of International Search Report dated Jan. 21, 2020, 2 pages.

* cited by examiner

*Primary Examiner* — Abdelnabi O Musa
(74) *Attorney, Agent, or Firm* — Cozen O'Connor

(57) ABSTRACT

A cell handover method, the method includes: performing a target cell handover and stopping data transmission between a target cell and a source cell; and saving resource configuration information of the source cell.

15 Claims, 11 Drawing Sheets

CELL HANDOVER METHOD AND APPARATUS

CROSS-REFERENCE TO RELATED APPLICATION

This application is a continuation application of International Application No. PCT/CN2019/088655, filed on May 27, 2019, the entire contents of which are incorporated herein by reference.

TECHNICAL FIELD

The disclosure relates to the field of communication technology, in particular to a cell handover method, and a cell handover apparatus.

BACKGROUND

In the related art, a terminal may need to perform a cell handover once in a while. However, sometimes the cell handover may fail. When the cell handover fails, the services currently being performed by the terminal may be interrupted, resulting in poor user experience.

SUMMARY

In order to overcome the problems in the related art, this disclosure provides a cell handover method, a cell handover apparatus and a storage medium.

According to embodiments of the present disclosure, a cell handover method is provided. The method includes: performing a target cell handover and stopping data transmission between a target cell and a source cell; and saving resource configuration information of the source cell.

According to embodiments of the present disclosure, a cell handover apparatus is provided. The apparatus includes: performing a target cell handover and stopping data transmission between a target cell and a source cell by a terminal; and starting a second timer and saving context of the terminal.

According to embodiments of the present disclosure, a cell handover apparatus is provided. The cell handover apparatus includes: a processor; a memory configured to store executable instructions of the processor; in which the processor is configured to perform a target cell handover and stop data transmission between a target cell and a source cell, and save resource configuration information of the source cell.

It should be understood that the above general description and the following detailed description are only exemplary and explanatory, and cannot limit the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to the embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the disclosure. Instead, they are merely examples of apparatuses and methods consistent with aspects related to the disclosure as recited in the appended claims.

Figure 1:
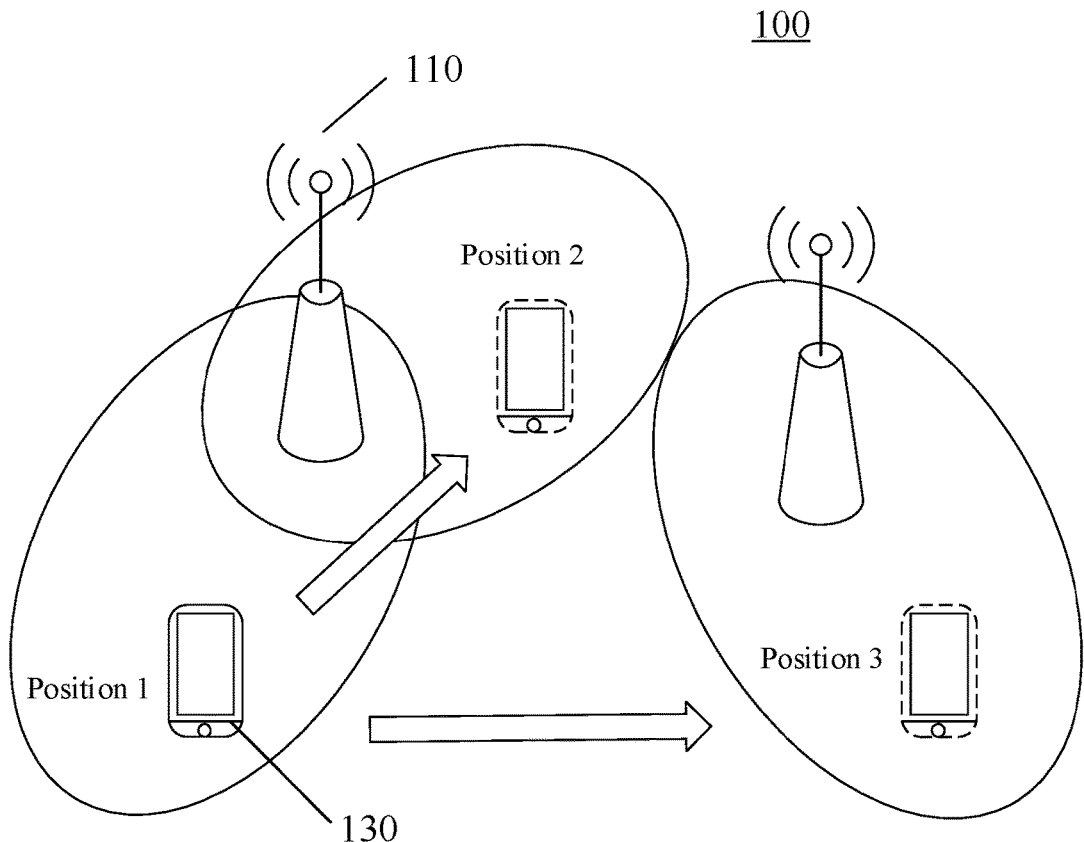
FIG. 1 is a schematic diagram of a wireless communication system according to some embodiments.

The cell handover method of the disclosure is applied to a wireless communication system 100 shown in FIG. 1. As illustrated in FIG. 1, the wireless communication system 100 includes a network device 110, a network device 120 and a terminal 130. The terminal 130 is connected to the network device 110 and the network device 120 through wireless resources, to perform data transmission.

It is understandable that the wireless communication system 100 shown in FIG. 1 is only for schematic illustration, and the wireless communication system 100 may also include other network devices, such as core network devices, wireless relay devices, and wireless backhaul devices, which are not shown in FIG. 1. The embodiments of the disclosure do not limit a number of network devices and a number of terminals in the wireless communication system.

It can be further understood that the wireless communication system of the embodiments of the disclosure is a network that provides wireless communication functions. The wireless communication systems can use different communication technologies, such as code division multiple access (CDMA), wideband code division multiple access (WCDMA), and time division multiple access (TDMA), frequency division multiple access (FDMA), orthogonal frequency-division multiple access (OFDMA), single Carrier FDMA (SC-FDMA), carrier sense multiple access with collision avoidance. According to different network capacity, speed, delay and other factors, the network can be divided into 2G (second-generation) network, 3G network, 4G network or future evolution networks, such as 5G network. 5G network can also be called a New Radio (NR) network. For the convenience of description, the wireless communication network is sometimes referred to as a network for short in this disclosure.

Further, the network device 110 and the network device 120 in the disclosure may also be referred to as wireless access network devices. The wireless access network device may be: a base station, an evolved node B (base station), a home base station, an access point (AP) of a wireless fidelity (WIFI) system, a wireless relay node, a wireless backhaul node, a transmission point (TP), or a transmission and reception point (TRP). The wireless access network device may be a gNB in the NR system, or can also be a component or part of the device constituting the base station. It should be understood that, in the embodiments of the disclosure, the specific technology and specific device form adopted by the network device are not limited. In the disclosure, the network device can provide communication coverage for a specific geographic area, and can communicate with terminals located in the coverage area (cell). The network device provides services for the cell, and the terminal communicates with the network device through transmission resources (e.g., frequency domain resources) used by the cell, and the cell may be a cell corresponding to the network device (e.g., a base station). The cell may belong to a base station. In the following of the disclosure, the cell and the base station are often used interchangeably, and those skilled in the art should understand the meaning.

Further, the terminal 130 of the disclosure may also be referred to as a terminal device, a user equipment (UE), a mobile station (MS), a mobile terminal (MT), which is a kind of devices through which the user provides voice and/or data connectivity. For example, the terminal may be a handheld device or a vehicle-mounted device having a wireless connection function. Currently, the terminal may be a mobile phone, a pocket personal computer, a handheld computer, a personal digital assistant (PDA), a notebook computer, a tablet computer, a wearable device, or a vehicle device. It should be understood that the embodiments of the disclosure do not limit the specific technology and specific device form adopted by the terminal.

The embodiments of the disclosure are mainly applicable to a communication scenario where the terminal 130 performs the cell handover. In the following description of the embodiments of the disclosure, the terminal 130 will be handed over from the source cell to the target cell as an example for description. It should be understood that the source cell and the target cell may be two different cells under the same base station, or two cells under different base stations. As shown in FIG. 1, in the source base station 110, the terminal 130 can switch from position 1 (the source cell) to position 2 (the target cell) to realize the handover of different cells under the same base station 110. The terminal 130 can also switch from the source base station 110 to the target base station 120, to realize the handover from position 1 (the source cell) to position 3 (the target cell) in FIG. 1, to realize the handover between different cells under different base stations. In these two handover scenarios, the handover is performed on a cell basis, and whether the source cell and the target cell are located in the same base station is not limited in the disclosure.

In the related art, when the terminal determines that the target cell needs to be handed over, the terminal will stop the data transmission with the source cell and release the resource configuration information of the source cell. If the handover of the target cell fails, the terminal will trigger a reconstruction process with the source cell, during which the service will be stopped, which affects the user experience.

In view of this, the embodiments of the disclosure provide a cell handover method. When determining the handover of the target cell, the resource configuration information of the source cell is saved, so that if the handover fails, the data transmission with the source cell is restored by using the saved resource configuration information of the source cell, so that the probability of service interruption in the case of cell handover failure is reduced.

Figure 2:
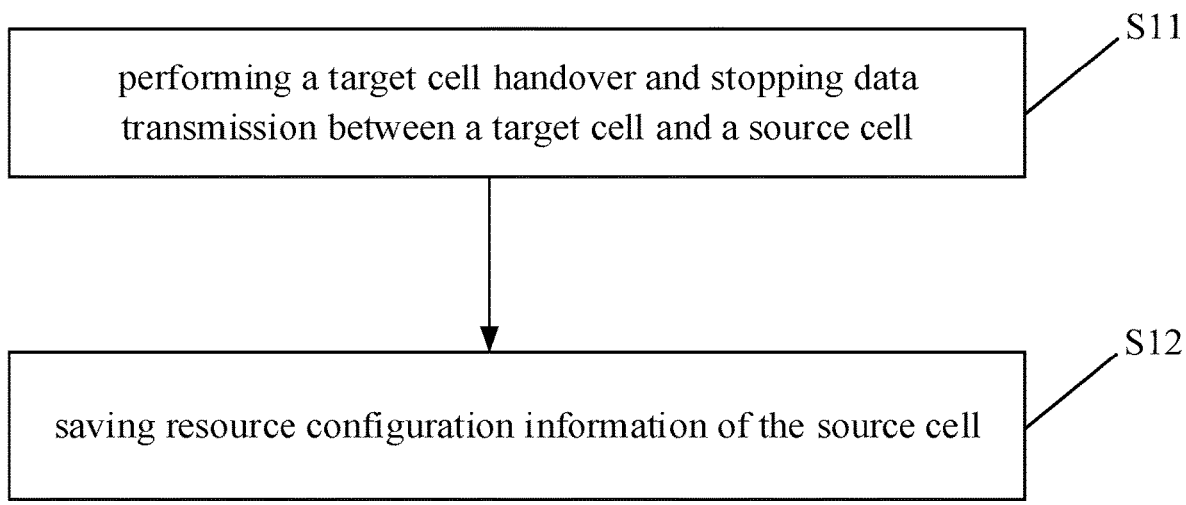
FIG. 2 is a flowchart of a cell handover method according to an embodiment.

FIG. 2 is a flowchart of a cell handover method according to an embodiment. The cell handover method shown in FIG. 2 can be applied to a terminal. As shown in FIG. 2, the cell handover method includes the following steps S11 and S12.

In step S11, a target cell handover is determined and data transmission between a target cell and a source cell is stopped.

In the embodiments of the disclosure, the terminal may adopt the following methods to determine to perform the target cell handover.

On the one hand, the terminal performs the target cell handover based on the handover instruction. The terminal measures the cell and obtains a measurement result, and the source cell sends the handover instruction to the target cell according to the measurement result reported by the terminal. After the target cell confirms that the cell handover is possible, the handover instruction is sent to the terminal, and the resource configuration information of the target cell is carried in the handover instruction. After receiving the handover instruction, the terminal performs the target cell handover, then stops data transmission with the source cell, and uses the resource configuration information of the target cell carried in the handover instruction to initiate a machine access process to the target cell to perform the target cell handover.

On the other hand, the terminal performs the target cell handover based on a conditional handover (CHO). The network device sends a CHO instruction to the terminal in advance, and the CHO instruction carries a cell identifier of the target cell handover and handover trigger conditions. When the handover trigger conditions are met, the terminal performs the target cell handover, stops the data transmission with the source cell, and initiates the target cell handover by itself, which does not require the network device to send the handover instruction again.

In step S12, resource configuration information of the source cell is saved.

In the embodiments of the disclosure, the resource configuration information of the source cell saved by the terminal may be a bearer configuration, a cell radio network temporary identifier (C-RNTI), and the like.

In the disclosure, the terminal can determine whether the target cell handover is successful or not. On the one hand, if the target cell handover is successful in the embodiment of the disclosure, the saved resource configuration information of the source cell can be released to save the storage resources. On the other hand, in the case of a target cell handover failure, the saved resource configuration information of the source cell can be used to restore the data transmission with the source cell, thereby reducing the probability of service interruption in the case of a cell handover failure.

Figure 3:
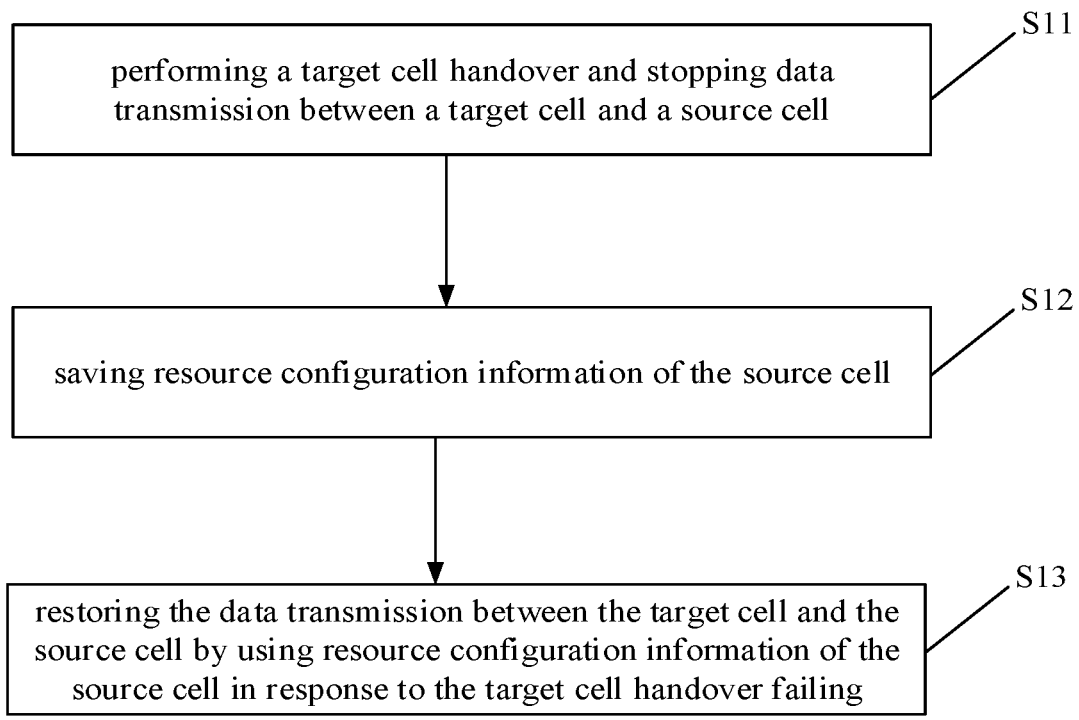
FIG. 3 is a flowchart of a cell handover method according to another embodiment.

FIG. 3 is a flowchart of a cell handover method according to an embodiment. The cell handover method shown in FIG. 3 can be applied to a terminal. As shown in FIG. 3, in addition to step S11 and step S12, the cell handover method may also include the following step S13.

In step S13, the data transmission between the target cell and the source cell is restored by using resource configuration information of the source cell in response to failure of the target cell handover.

In the embodiments of the disclosure, when the data transmission with the source cell is restored by using the saved resource configuration information of the source cell, the resource configuration information of the target cell can be released to save the storage resources.

In an example of the disclosure, a timer can be set for the terminal to save the resource configuration information of the source cell, and the timer is used to determine the duration of saving the resource configuration information of the source cell. For the convenience of description in this disclosure, the timer set for the terminal to save the resource configuration information of the source cell is called the first timer.

The first timer of the disclosure may be pre-configured by the system, or may be carried in the handover instruction sent by the source base station.

The duration of the first timer can be set according to actual conditions. For example, the duration can be set according to a moving speed of the terminal, a coverage area of the base station configured by the network, and a working frequency band. For example, the duration of the first timer set when the working frequency band is a high frequency may be greater than the duration of the first timer set when the working frequency band is a low frequency. Generally, the duration of the first timer is set to a millisecond level, for example, 5 milliseconds, 10 milliseconds, or 30 milliseconds.

Figure 4:
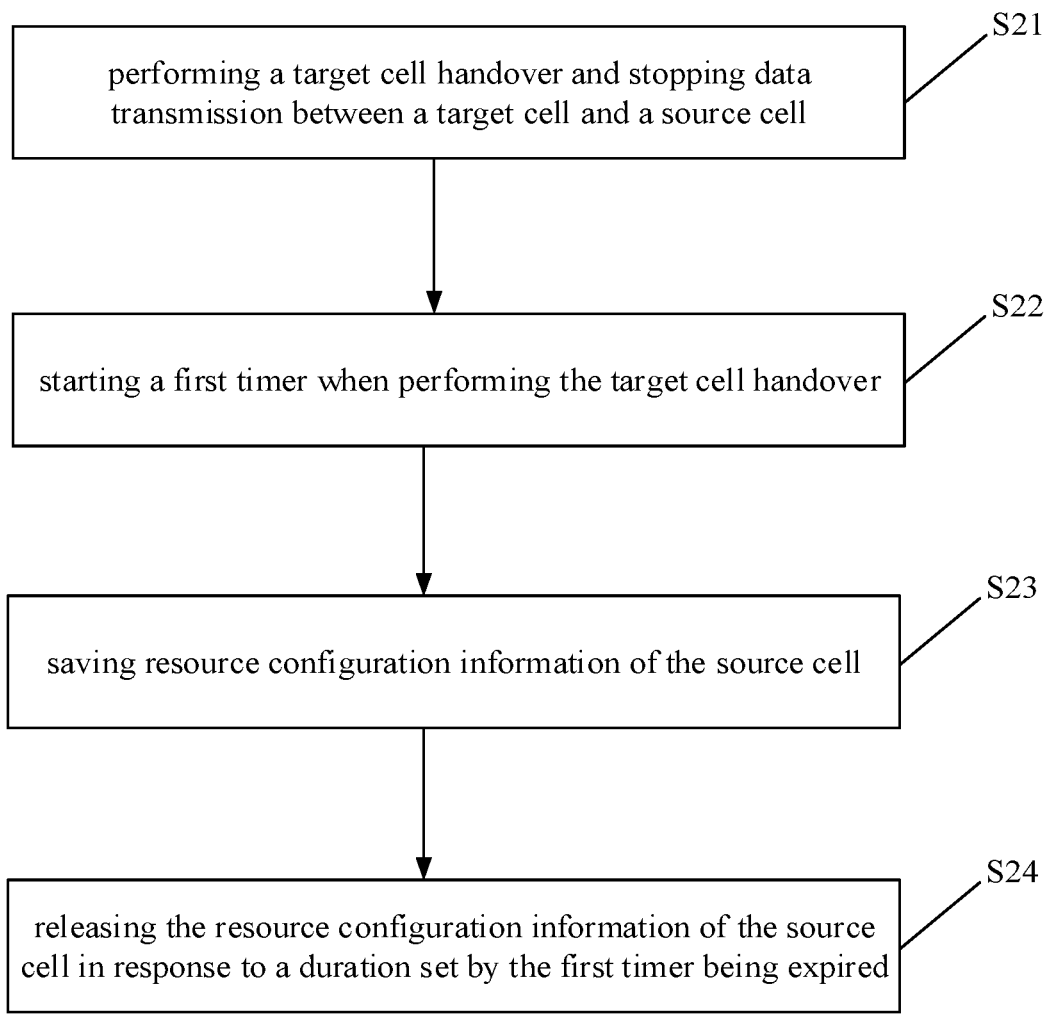
FIG. 4 is a flowchart of a cell handover method according to yet another embodiment.

FIG. 4 is a flowchart of a cell handover method according to an embodiment. The cell handover method shown in FIG. 4 can be applied to a terminal. As shown in FIG. 4, the cell handover method includes step S21 to step S24.

In step S21, a target cell handover is performed and data transmission between a target cell and a source cell is stopped.

In step S22, a first timer is started when performing the target cell handover.

The first timer is configured to determine a duration of saving the resource configuration information of the source cell.

In step S23, resource configuration information of the source cell is saved.

In step S24, the resource configuration information of the source cell is released in response to a duration set by the first timer being expired.

In the embodiments of the disclosure, if the target cell handover is successful, the first timer is stopped and the resource configuration information of the source cell can be released to save the storage resources.

Figure 5:
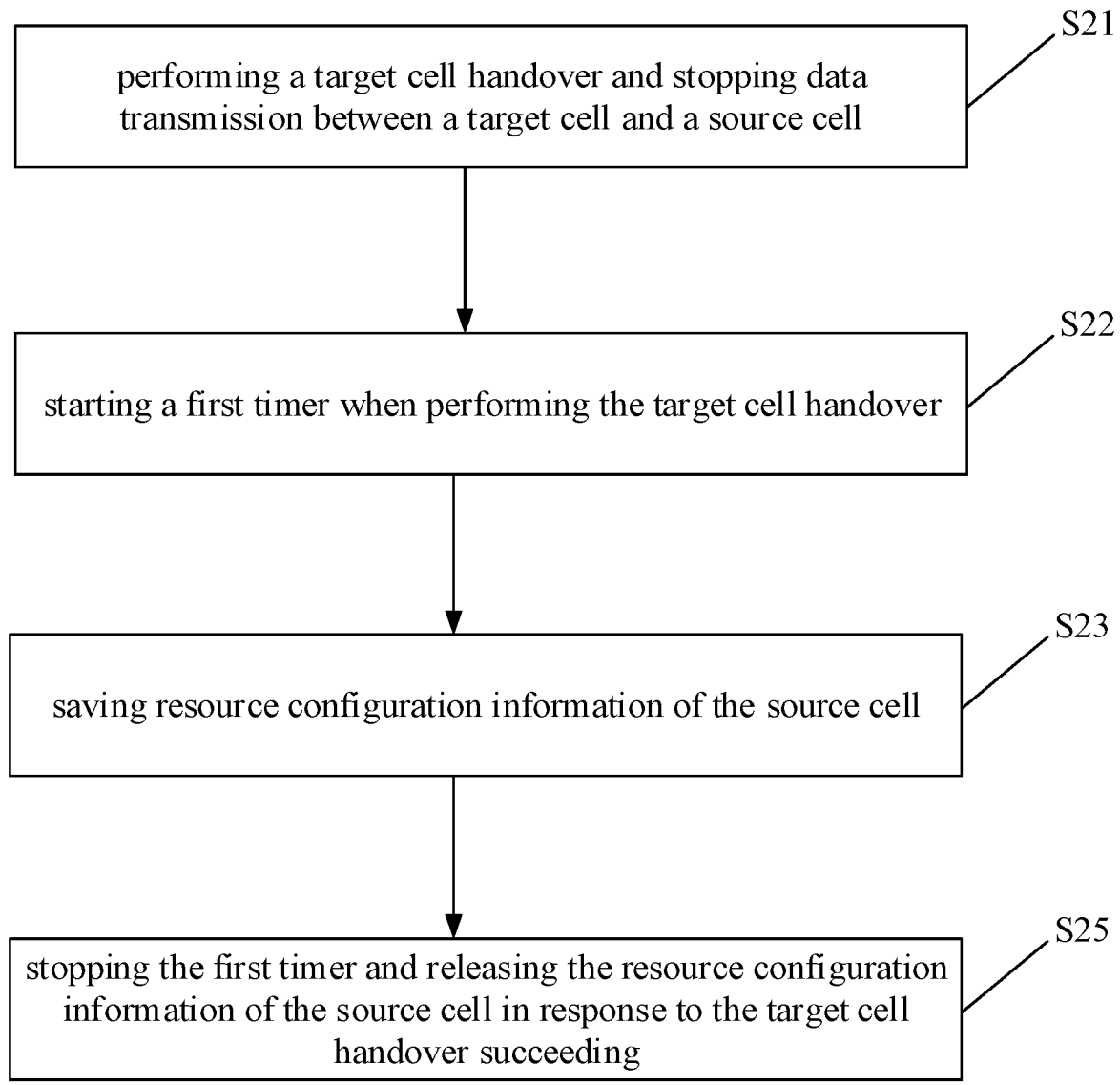
FIG. 5 is a flowchart of a cell handover method according to still another embodiment.

FIG. 5 is a flowchart of another cell handover method according to an embodiment. The cell handover method shown in FIG. 5 can be applied to a terminal. In the cell handover method shown in FIG. 5, in addition to step S21, step S22, and step S23, the following step S25 may also be included.

In step S25, the first timer is stopped and the resource configuration information of the source cell is released in response to success of the target cell handover.

In an example of the present disclosure, if the duration set by the first timer does not expire, the resource configuration information of the source cell continues to be saved. Further, before using the resource configuration information of the source cell to restore the data transmission with the source cell, it may be determined that the duration set by the first timer has not expired, so as to improve the success rate of restoring the data transmission with the source cell.

Furthermore, in the disclosure, a signal quality threshold for the terminal to determine whether to restore the data transmission with the source cell can be configured. Before using the resource configuration information of the source cell to restore the data transmission with the source cell, it is confirmed that the signal quality of the source cell is greater than the signal quality threshold, so as to improve the success rate of restoring the data transmission with the source cell.

In the disclosure, the signal quality threshold may be pre-configured by the system, or may be included in the handover instruction sent by the source base station.

In the disclosure, the signal quality threshold can be set according to actual conditions, for example, −98 db.

Figure 6:
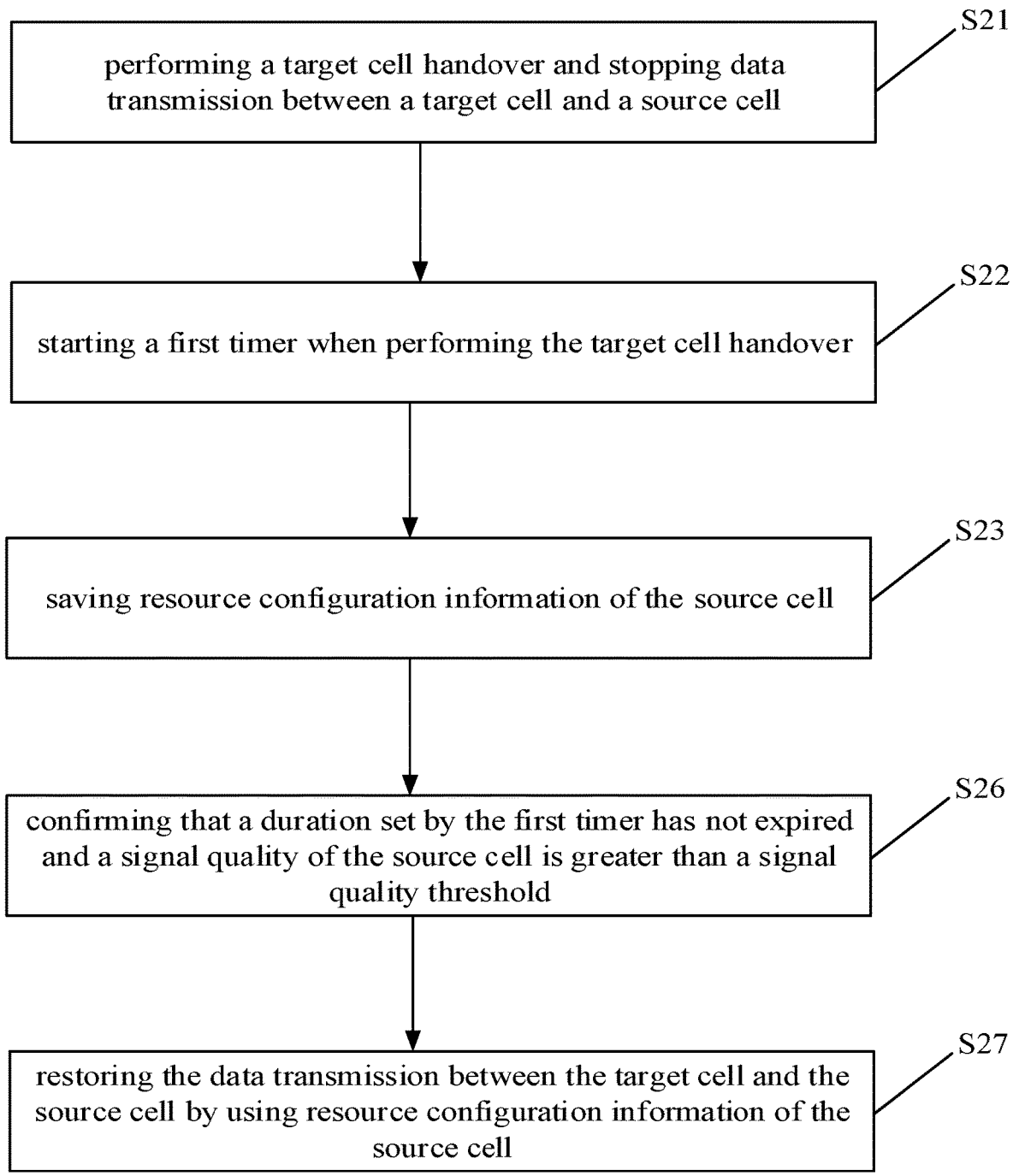
FIG. 6 is a flowchart of a cell handover method according to still another embodiment.

FIG. 6 is a flowchart of another cell handover method according to an embodiment. The cell handover method shown in FIG. 6 can be applied to a terminal. In the cell handover method shown in FIG. 6, in addition to step S21, step S22, and step S23, the following step S26 and step S27 can also be included.

In step S26, it is confirmed that a duration set by the first timer has not expired and a signal quality of the source cell is greater than a signal quality threshold.

In one aspect of the disclosure, by confirming that the duration set by the first timer has not expired, it is determined that the terminal still saves the resource configuration information of the source cell. On the other hand, by determining that the signal quality of the source cell is greater than the signal quality threshold, the signal quality of the source cell can be guaranteed to meet data transmission conditions when restoring the data transmission with the source cell.

In step S27, the data transmission between the target cell and the source cell is restored by using resource configuration information of the source cell.

In the disclosure, if the duration set by the first timer has expired or the signal quality of the source cell is less than the signal quality threshold, there is no need to restore the data transmission between the terminal and the source cell.

In an example of the disclosure, the duration may be included in the handover instruction sent by the source base station, and the signal quality threshold may also be included in the handover instruction sent by the source base station.

Figure 7:
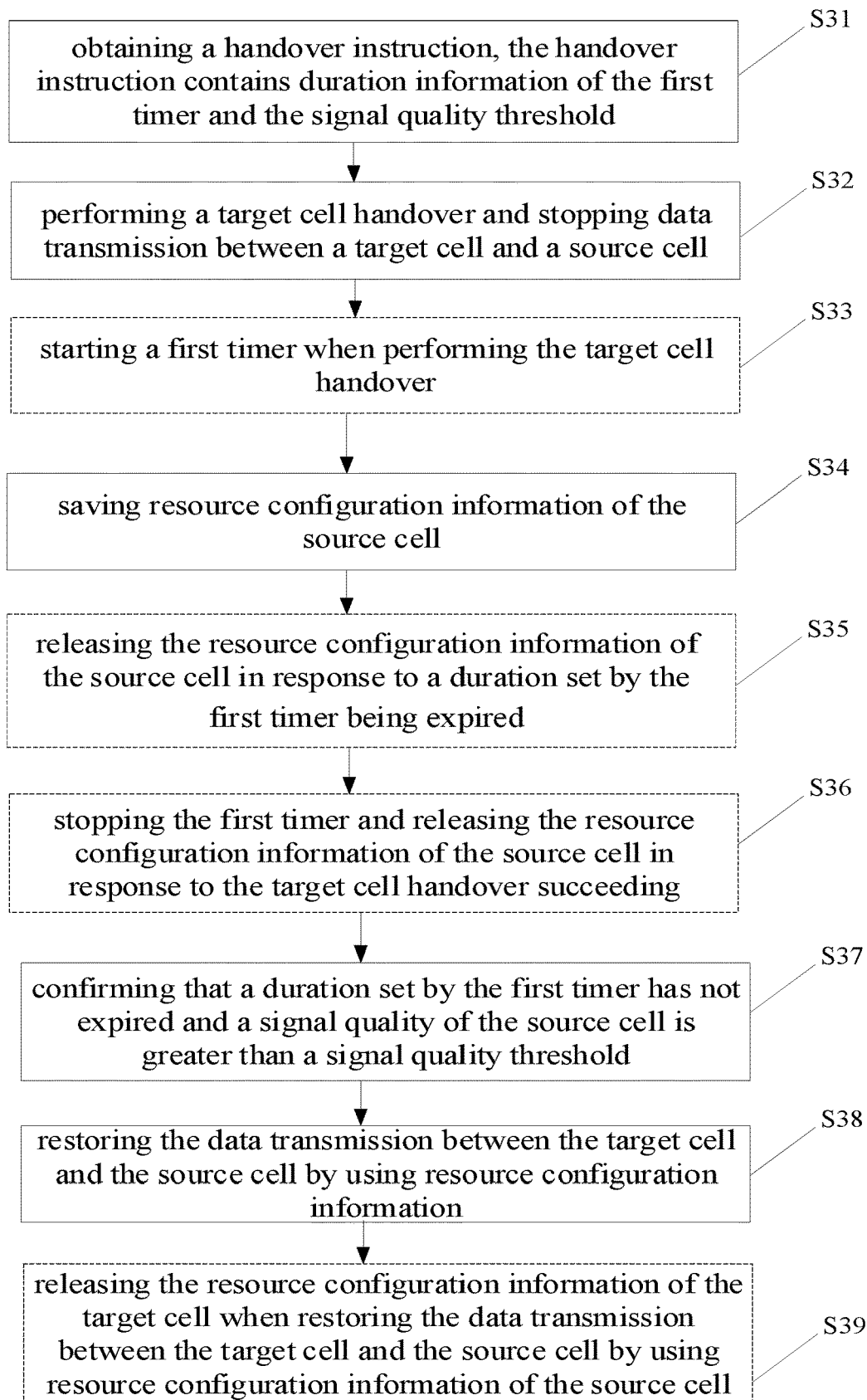
FIG. 7 is a flowchart of a cell handover method according to still another embodiment.

FIG. 7 is a flowchart of another cell handover method according to an embodiment. The cell handover method shown in FIG. 7 can be applied to a terminal. As shown in FIG. 7, the cell handover method shown in FIG. 7 includes step S31.

In step S31, a handover instruction sent by a source base station is obtained.

In the disclosure, the handover instruction contains duration information of the first timer or the signal quality threshold, or the duration information of the first timer and the signal quality threshold.

For example, in FIG. 7, the handover instruction sent by the source base station includes the duration information of the first timer and the signal quality threshold.

In the cell handover method shown in FIG. 7, step S32 to step S38 are the same as step S21 to step S27, and will not be described in detail here. Step S35, step S36 and step S39 are optional steps.

In step S39, the resource configuration information of the target cell is released when restoring the data transmission between the target cell and the source cell using the resource configuration information of the source cell.

In an example of the disclosure, when the network device determines that the terminal performs the target cell handover, and the terminal stops the data transmission with the source cell, the context of the terminal can be saved, so as to subsequently use the saved context to restore the data transmission between the terminal and the source cell.

In an example of the disclosure, the network can set a timer for the network device to save the context of the terminal, and the timer is used to determine the duration of saving the context of the terminal. In this disclosure, for the convenience of description, the timer set for storing the context of the terminal for the network device is called the second timer.

The second timer in the disclosure may be pre-configured by the system.

Figure 8:
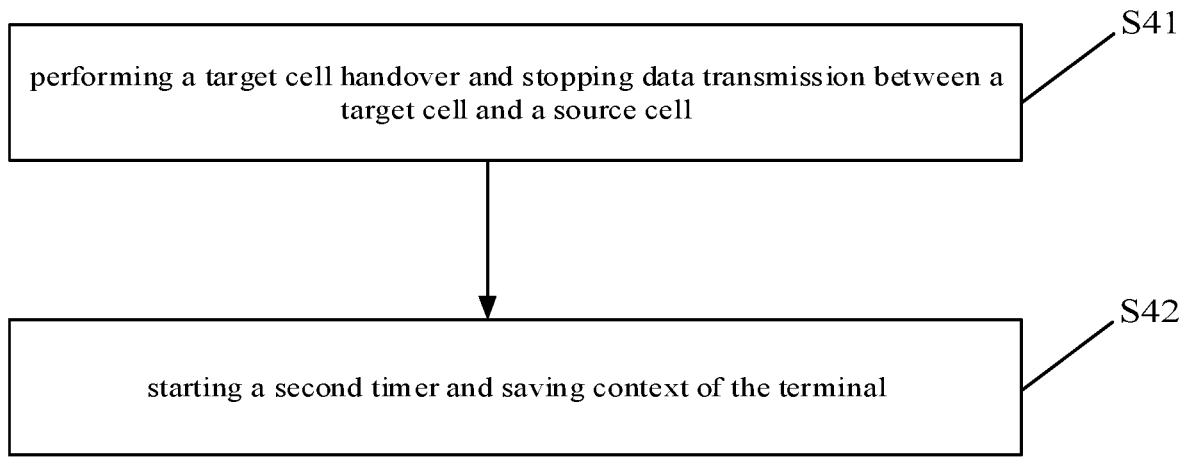
FIG. 8 is a flowchart of a cell handover method according to still another embodiment.

FIG. 8 is a flowchart of another cell handover method according to an embodiment. The cell handover method shown in FIG. 8 can be applied to the network device. The network device may be the source base station to which the source cell belongs. As shown in FIG. 8, the cell handover method includes steps S41 to S42.

In step S41, a target cell handover is performed and data transmission between a target cell and a source cell is stopped.

In step S42, a second timer is started and context of the terminal is saved.

In an example of the disclosure, on the one hand, after the terminal successfully performs the target cell handover, the network device can release the saved context of the terminal to save the storage resources. On the other hand, when the duration set by the second timer has expired, the context of the terminal can be released to save the storage resources.

In an example of the disclosure, the network device may send the handover instruction to the terminal, so that the terminal performs the cell handover method based on the handover instruction.

Figure 9:
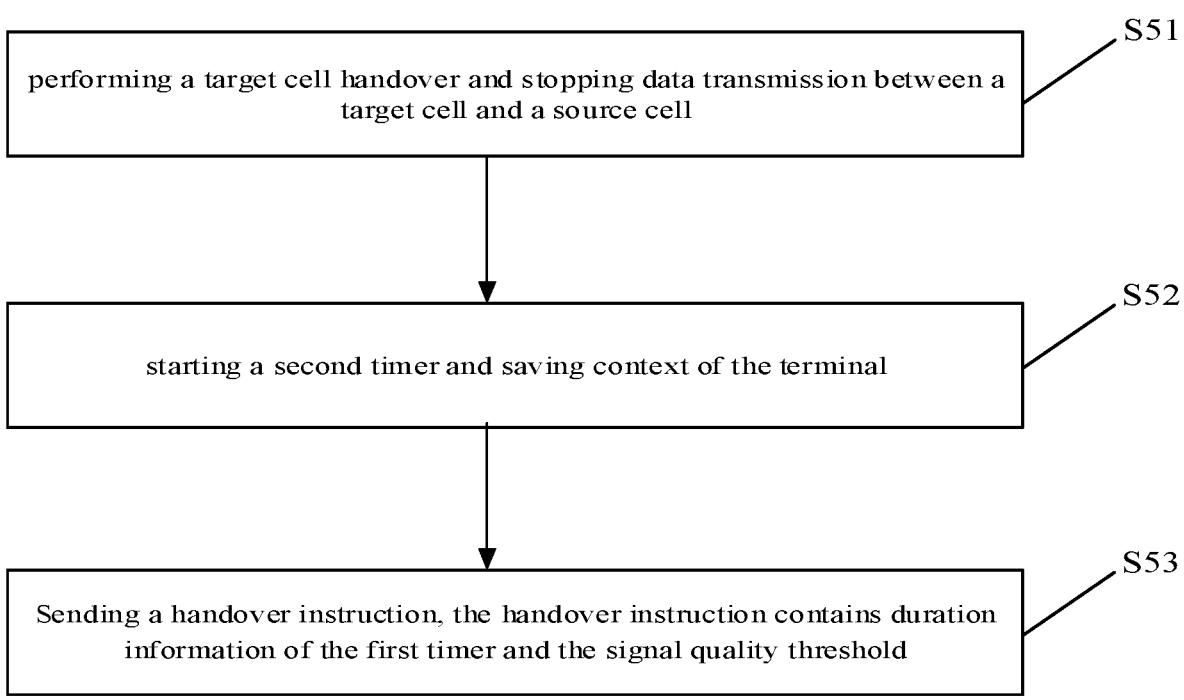
FIG. 9 is a flowchart of a cell handover method according to still another embodiment.

FIG. 9 is a flowchart of another cell handover method according to an embodiment. The cell handover method shown in FIG. 9 can be applied to the network device. As shown in FIG. 9, the cell handover method includes step S51 to step S53.

In step S51, a switching instruction is issued to the terminal.

In the present disclosure, the switching instruction includes the duration information of the first timer, or includes the signal quality threshold, or includes the duration information of the first timer and the signal quality threshold. For example, in FIG. 9, the switching instruction includes the duration information of the first timer and the signal quality threshold.

In the disclosure, the duration information of the first timer included in the switching instruction is used for the terminal to determine the duration of saving the resource configuration information of the source cell. The signal quality threshold included in the switching instruction is used by the terminal to determine whether to restore the data transmission with the source cell.

In the cell handover method shown in FIG. 9, step S52 and step S53 are the same as step S41 and step S42, and will not be repeated here.

In the following, the disclosure will describe the implementation process of the above cell handover method by the terminal and the network device in combination with practical applications.

Figure 10:
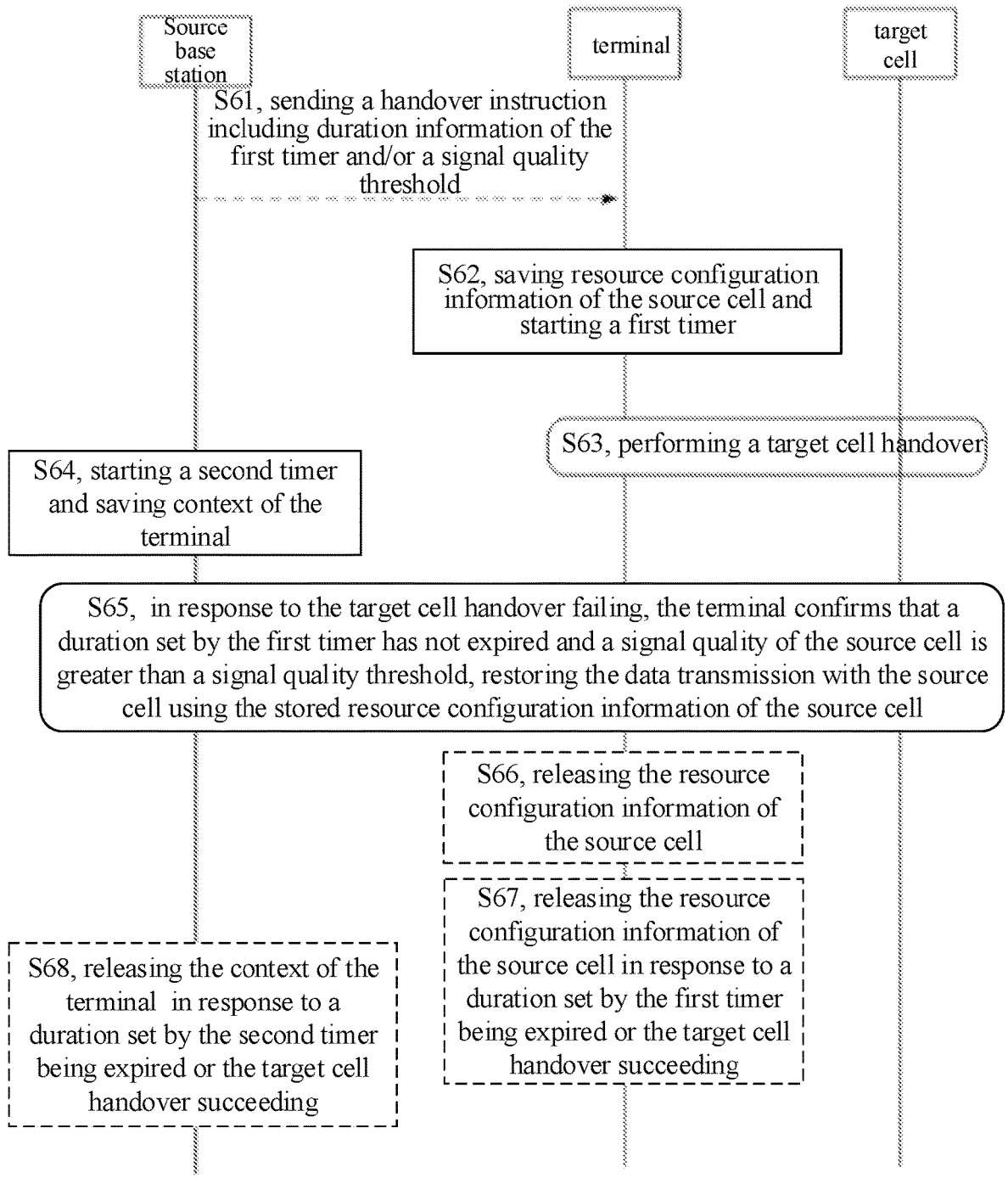
FIG. 10 is a flowchart of a cell handover method according to still another embodiment.

FIG. 10 is a flowchart of another cell handover method according to an embodiment of the disclosure. As illustrated in FIG. 10, the cell handover method includes the following steps.

In step 61, the source base station to which the source cell belongs issues a switching instruction to the terminal, and the terminal obtains the switching instruction sent by the network device.

On the one hand, the switching instruction may include the cell identifier of the target cell, the duration information of the first timer, and the signal quality threshold. For example, the switching instruction includes a target cell 1, and carries the duration information of the first of 100 ms and a signal quality threshold of −98 db.

On the other hand, in addition to information such as the cell identifier of the target cell, the duration information of the first timer, and the signal quality threshold, the switching instruction may also include a handover trigger condition for the terminal to trigger the target cell handover. For example, the handover trigger condition may be that the reference signal receiving power (RSRP) of the target cell is greater than a set value of a serving cell (the source cell), for example, by 3 db.

It is understandable that the duration information of the first timer and/or the signal quality threshold of the disclosure may be pre-configured by the system, so step S61 is an optional step, and the switching instruction may include the duration information of the first timer and one or more of the signal quality thresholds.

In step S62, the terminal performs the target cell handover, stops the data transmission with the source cell, saves the resource configuration information of the source cell, and starts the first timer.

In step S63, the terminal initiates an access to the target cell to perform the target cell handover.

In step S64, the source base station starts a second timer, and saves the context of the terminal in response to determining that the terminal performs the target cell handover, and the data transmission with the terminal is stopped.

In step S65, the terminal confirms that a duration set by the first timer has not expired and a signal quality of the source cell is greater than a signal quality threshold in response to the target cell handover failing, and restores the data transmission between the target cell and the source cell using the saved resource configuration information of the source cell.

For example, in the disclosure, the terminal determines that the duration set by the first timer has not expired and the signal quality of the source cell (i.e., −97 db) is greater than the signal quality threshold (i.e., −98 db), then the data transmission with the source cell is restored by using the saved resource configuration information of the source cell.

In step S66, the terminal releases the resource configuration information of the target cell.

In the disclosure, the terminal releases the resource configuration information of the target cell when restoring the data transmission with the source cell by using the saved resource configuration information of the source cell.

In step S67, the terminal releases the resource configuration information of the source cell.

In the disclosure, on the one hand, when the duration set by the first timer has expired, the terminal releases the resource configuration information of the source cell. On the other hand, when the target cell handover is successful, the terminal stops the first timer and releases the resource configuration information of the source cell.

In step S68, the source base station releases the context of the terminal.

In the disclosure, on the one hand, when the duration set by the second timer has expired, the source base station releases the context of the terminal. On the other hand, the source base station may release the context of the terminal when receiving the handover success indication sent by the target cell.

As shown in FIG. 10 of the disclosure, the terminal and the network device specifically implement the cell handover method, reference may be made to the description of the cell handover method in FIGS. 2 to 9, which will not be described in detail here. It can be understood that in FIG. 10 of the disclosure, step S61, step S66, step S67, and step S68 are optional steps.

In the cell handover method of the disclosure, the terminal saves the resource configuration information of the source cell during the target cell handover, and the network device saves the context of the terminal, so that if the target cell handover fails, the saved resource configuration information of the source cell can be used to restore the connection with the source cell, thereby reducing a probability of service interruption in the case of cell handover failure.

Based on the same concept, the embodiments of the disclosure also provide a cell handover apparatus.

It can be understood that, in order to implement the above functions, the cell handover apparatus of the embodiments of the disclosure includes hardware structures and/or software modules corresponding to each function. In combination with the units and algorithm steps of the examples disclosed in the embodiments of the disclosure, the embodiments of the disclosure can be implemented in the form of hardware or a combination of hardware and computer software. Whether a certain function is executed by hardware or hardware driven by computer software depends on the specific application and design constraint conditions of the technical solution. Those skilled in the art can use different methods for each specific application to implement the described functions, but such implementation should not be considered as going beyond the scope of the technical solution of the embodiments of the disclosure.

Figure 11:
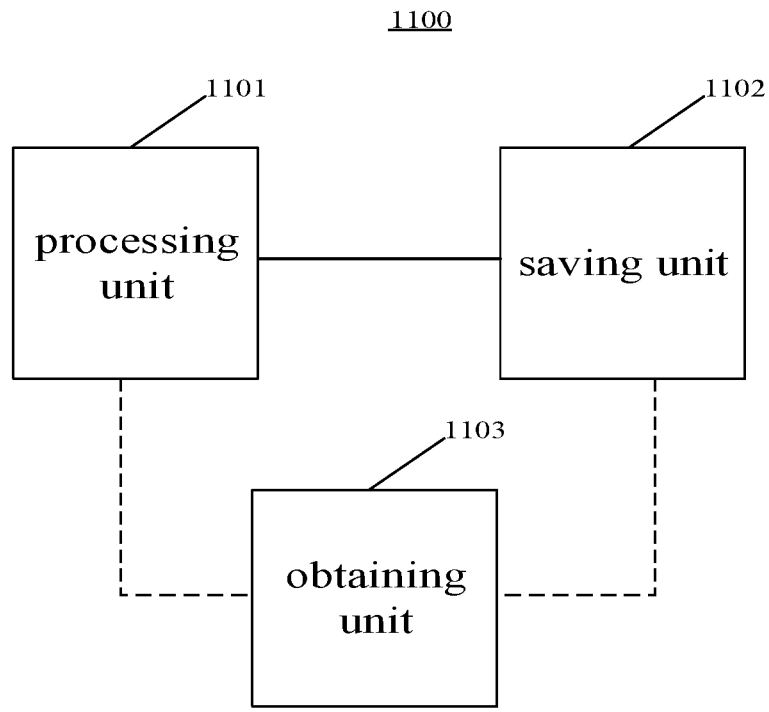
FIG. 11 is a block diagram of a cell handover apparatus according to an embodiment.

FIG. 11 is a block diagram of a cell handover apparatus 1100 according to an embodiment. The cell handover apparatus 1100 may be applied to a terminal. The cell handover apparatus 1100 may be a mobile phone, a computer, a digital broadcasting terminal, a message transceiver device, a game console, a tablet device, a medical device, a fitness device and a personal digital assistant.

As illustrated in FIG. 11, the cell handover apparatus 1100 includes a processing unit 1101 and a saving unit 1102.

The processing unit 1101 is configured to perform a target cell handover and stop data transmission between a target cell and a source cell.

The saving unit 1102 is configured to save resource configuration information of the source cell.

The processing unit 1101 is further configured to restore the data transmission between the target cell and the source cell by using resource configuration information of the source cell in response to the target cell handover failing.

The saving unit 1102 is further configured to start a first timer when performing the target cell handover. The first timer is configured to determine a duration of saving the resource configuration information of the source cell.

The processing unit 1101 is further configured to confirm that a duration set by the first timer has not expired and a signal quality of the source cell is greater than a signal quality threshold before restoring the data transmission between the target cell and the source cell using the resource configuration information of the source cell.

The saving unit 1102 is further configured to release the resource configuration information of the source cell in response to a duration set by the first timer being expired.

The saving unit 1102 is further configured to stop the first timer and release the resource configuration information of the source cell in response to success of the target cell handover.

As shown in FIG. 11, the apparatus 1100 further includes an obtaining unit 1103.

The obtaining unit 1103 is configured to obtain a handover instruction sent by a source base station which the source cell belongs to, where the handover instruction contains duration information of the first timer.

The obtaining unit 1103 is configured to obtain a handover instruction sent by a source base station of the source cell, where the handover instruction contains the signal quality threshold.

The storing unit 1102 is further configured to release the resource configuration information of the target cell.

Figure 12:
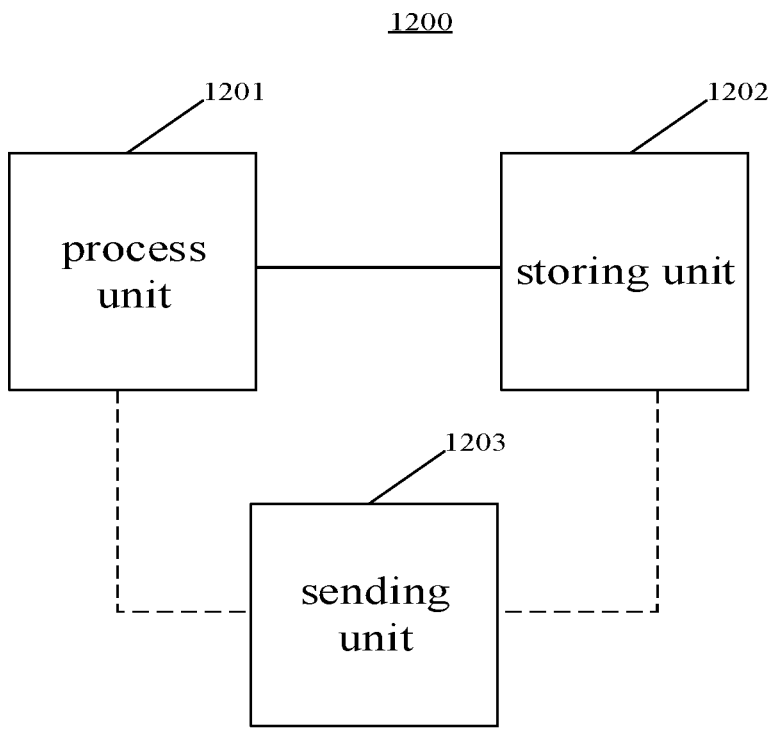
FIG. 12 is a block diagram of another cell handover apparatus according to another embodiment.

FIG. 12 is a block diagram of another cell handover apparatus 1200 according to an embodiment. The cell handover apparatus 1200 is applied to a network device. The cell handover apparatus 1200 may be a base station.

As shown in FIG. 12, the cell handover apparatus 1200 includes a process unit 1201 and a storing unit 1202.

The process unit 1201 is configured to perform a target cell handover and stop data transmission between a target cell and a source cell by a terminal.

The storing unit 1202 is configured to start a second timer and save context of the terminal.

The storing unit 1202 is further configured to release the context of the terminal when a duration set by the second timer has expired.

As shown in FIG. 12, the cell handover apparatus 1200 includes a sending unit 1203. The sending unit 1203 is configured to: issue a switching instruction to the terminal, where the switching instruction contains duration information of the first timer; and determine a duration of saving resource configuration information of the source cell by the terminal using the first timer.

The sending unit is further configured to: issue a switching instruction to the terminal, where the switching instruction contains a signal quality threshold; and determine whether to restore the data transmission between the target cell and the source cell by the terminal based on the signal quality threshold.

Regarding the apparatus in the foregoing embodiments, the specific manner in which each module performs operation has been described in detail in the embodiments of the method, and detailed description will not be given here.

Figure 13:
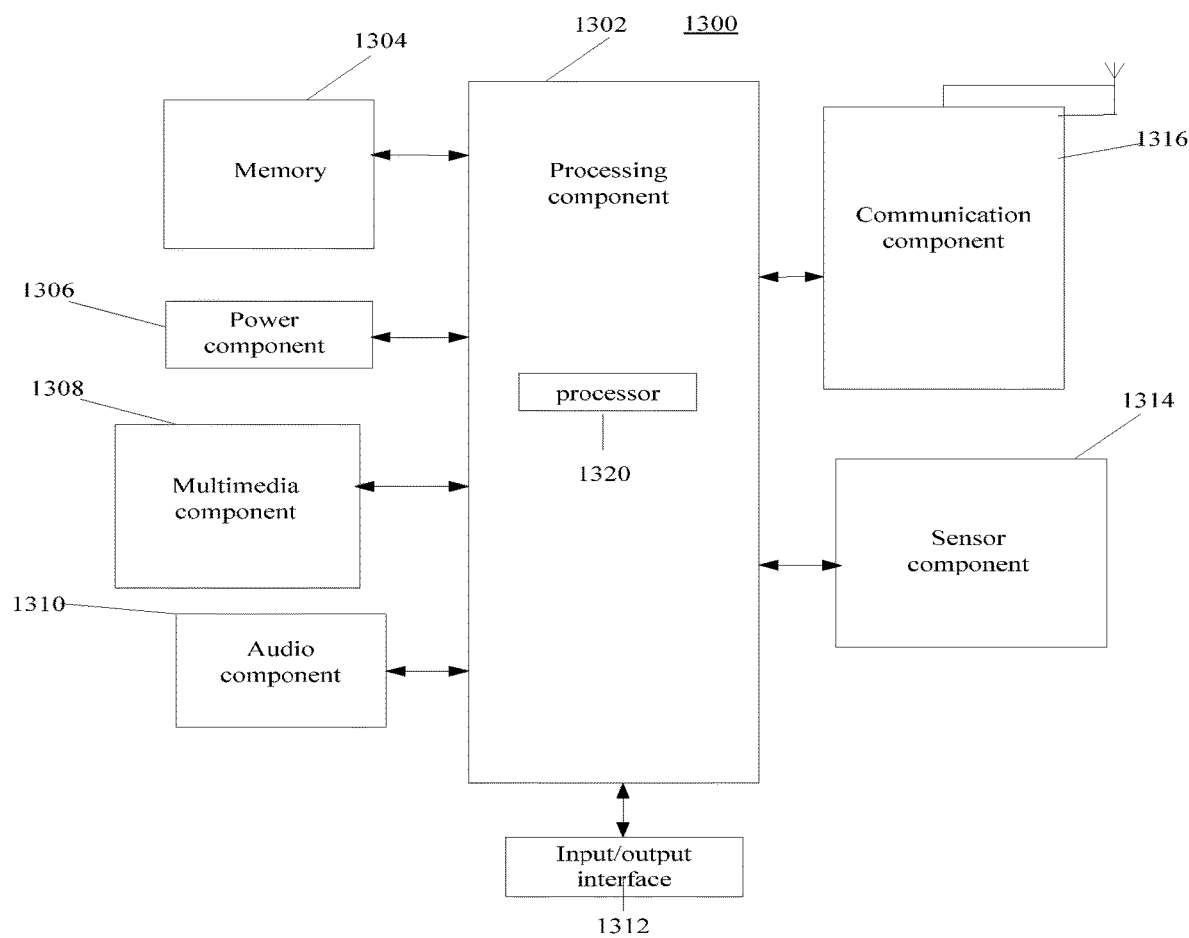
FIG. 13 is a schematic diagram of a cell handover apparatus according to yet another embodiment.

FIG. 13 is a schematic diagram of a cell handover apparatus 1300 according to an embodiment. The cell handover apparatus 1300 is applied to a terminal. The apparatus 1300 may be a mobile phone, a computer, a digital broadcasting terminal, a message transceiver device, a game console, a tablet device, a medical device, a fitness device and a personal digital assistant.

As illustrated in FIG. 13, the apparatus 1300 may include one or more of the following components: a processing component 1302, a memory 1304, a power component 1306, a multimedia component 1308, an audio component 1310, an input/output (I/O) interface 1312, a sensor component 1314, and a communication component 1316.

The processing component 1302 generally controls overall operations of the apparatus 1300, such as the operations associated with display, telephone calls, data communications, camera operations, and recording operations. The processing component 1302 may include one or more processors 820 to execute instructions to perform all or part of the steps in the above described method. Moreover, the processing component 1302 may include one or more modules which facilitate the interaction between the processing component 1302 and other components. For instance, the processing component 1302 may include a multimedia module to facilitate the interaction between the multimedia component 1308 and the processing component 1302.

The memory 1304 is configured to store various types of data. For example, the processor 820 can store executable instructions to support the operation of the apparatus 1300. Examples of such data include instructions for any applications or methods operated on the apparatus 1300, contact data, phonebook data, messages, pictures, and video. The memory 1304 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1306 provides power to various components of the apparatus 1300. The power component 1306 may include a power management system, one or more power sources, and any other components associated with the generation, management, and distribution of power in the apparatus 1300.

The multimedia component 1308 includes a screen providing an output interface between the apparatus 1300 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1308 includes a front-facing camera and/or a rear-facing camera. When the apparatus 1300 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 1310 is configured to output and/or input audio signals. For example, the audio component 1310 includes a microphone (MIC) configured to receive an external audio signal when the apparatus 1300 is in an operation mode, such as a call mode, a recording mode, and a voice recognition mode. The received audio signal may be further stored in the memory 1304 or transmitted via the communication component 1316. In some embodiments, the audio component 1310 further includes a speaker to output audio signals.

The I/O interface 1312 provides an interface between the processing component 1302 and peripheral interface modules, such as a keyboard, a click wheel, buttons, and the like. The buttons may include, but are not limited to, a home button, a volume button, a starting button, and a locking button.

The sensor component 1314 includes one or more sensors to provide status assessments of various aspects of the apparatus 1300. For instance, the sensor component 1314 may detect an open/closed status of the apparatus 1300, relative positioning of components, e.g., the display and the keypad, of the apparatus 1300, a change in position of the apparatus 1300 or a component of the apparatus 1300, a presence or absence of user contact with the apparatus 1300, an orientation or an acceleration/deceleration of the apparatus 1300, and a change in temperature of the apparatus 1300. The sensor component 1314 may include a proximity sensor configured to detect the presence of nearby objects without any physical contact. The sensor component 1314 may also include a light sensor, such as a CMOS or CCD image sensor, for use in imaging applications. In some embodiments, the sensor component 1314 may also include an accelerometer sensor, a gyroscope sensor, a magnetic sensor, a pressure sensor, or a temperature sensor.

The communication component 1316 is configured to facilitate communication, wired or wirelessly, between the apparatus 1300 and other devices. The apparatus 1300 can access a wireless network based on a communication standard, such as WiFi, 2G, or 3G, or a combination thereof. In an embodiment, the communication component 1316 receives a broadcast signal or broadcast associated information from an external broadcast management system via a broadcast channel. In an embodiment, the communication component 1316 further includes a near field communication (NFC) module to facilitate short-range communications. For example, the NFC module may be implemented based on a radio frequency identity (RFID) technology, an infrared data association (IrDA) technology, an ultra-wideband (UWB) technology, a Bluetooth (BT) technology, and other technologies.

In embodiments, the apparatus 1300 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described method.

In some embodiments, there is also provided a non-transitory computer readable storage medium including instructions, such as included in the memory 1304, executable by the processor 1320 in the apparatus 1300, for performing the above method. For example, the non-transitory computer-readable storage medium may be a ROM, a RAM, a CD-ROM, a magnetic tape, a floppy disc, an optical data storage device, and the like.

Figure 14:
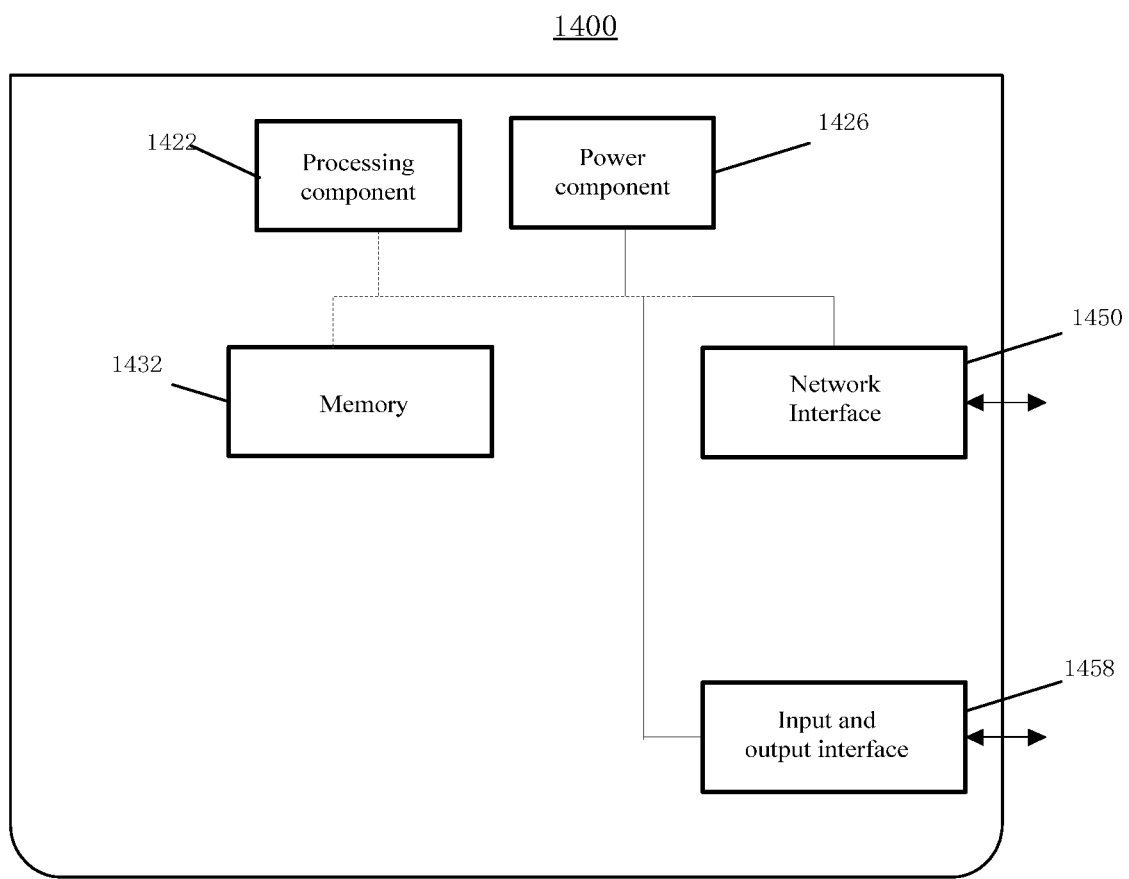
FIG. 14 is a schematic diagram of another cell handover apparatus according to still another embodiment.

FIG. 14 is a schematic diagram of another cell handover apparatus 1400 according to an embodiment. The apparatus 1400 can be applied to a network device. For example, the apparatus 1400 may be provided as a network device, such as a base station or a core network device. As illustrated in FIG. 14, the apparatus 1400 includes a processing component 1422, which further includes one or more processors, and a memory resource represented by a memory 1432 for storing instructions executable by the processing component 1422, such as application programs. The application programs stored in the memory 1432 may include one or more modules each corresponding to a set of instructions. In addition, the processing component 1422 is configured to execute instructions to implement the cell handover method.

The apparatus 1400 may also include a power component 1426 configured to perform power management of the apparatus 1400, a wired or wireless network interface 1450 configured to connect the apparatus 1400 to a network, and an input/output (I/O) interface 1458. The apparatus 1400 can operate based on an operating system stored in the memory 1432, such as Windows Server™, Mac OS X™, Unix™, Linux™, FreeBSD™ or the like.

In an embodiment, there is also provided a non-transitory computer-readable storage medium including instructions, such as a memory 1432 including instructions, which can be executed by the processing component 1422 of the apparatus 1400 to complete the above cell handover method. For example, the non-transitory computer-readable storage medium may be a ROM, a random access memory (RAM), a CD-ROM, a magnetic tape, a floppy disk, and an optical data storage device.

The embodiments of the disclosure also provide a communication system. The communication system includes the above cell handover apparatus 1100 applied to the terminal and the cell handover apparatus 1200 applied to the network device. The functions of the cell handover apparatus 1100 and the cell handover apparatus 1200 can be referred to detailed description of the above embodiments.

In the disclosure, the terms "operator network", "network" and "system" are sometimes used interchangeably, but those skilled in the art can understand the meanings.

It should be understood that "several" mentioned in the disclosure refers to one or more, and "a plurality of" refers to two or more. The term "and/or" describes an association relationship among the associated objects, indicating that there are three types of relationships, for example, A and/or B, i.e., A alone exists, A and B exist at the same time, and B exists alone. The character "/" generally indicates that the associated objects before and after are in an "or" relationship. The singular forms "a", "said" and "the" are also intended to include plural forms, unless the context clearly indicates other meanings.

It can be further understood that the terms "first" and "second" are used to describe various information, but the information should not be limited to these terms. These terms are only used to distinguish the same type of information from each other, and do not indicate a specific order or degree of importance. In fact, expressions such as "first" and "second" can be used interchangeably. For example, without departing from the scope of the disclosure, the first information may also be referred to as second information, and similarly, the second information may also be referred to as the first information.

It is understood that, although the operations are described in a specific order in the drawings in the embodiments of the disclosure, the operations do not need to be performed in the specific order shown or in a serial order, or are required to be performed to get a desired result. In certain circumstances, multitasking and parallel processing may be advantageous.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A cell handover method, performed by a terminal, comprising:
    obtaining a handover instruction sent by a source base station which a source cell belongs to, wherein the handover instruction contains duration information of a first timer of the terminal;
    performing a target cell handover and stopping data transmission between the source cell;
    starting the first timer when performing the target cell handover, wherein the first timer is configured to determine a duration of saving resource configuration information of the source cell; and
    saving the resource configuration information of the source cell using the first timer.

2. The method according to claim 1, further comprising:
    restoring the data transmission between the target cell and the source cell by using the resource configuration information of the source cell in response to failure of the target cell handover.

3. The method according to claim 2, further comprising:
    releasing the resource configuration information of the target cell.

4. The method according to claim 1, further comprising:
    confirming that a duration set by the first timer has not expired and a signal quality of the source cell is greater than a signal quality threshold before restoring the data transmission between the target cell and the source cell using the resource configuration information of the source cell.

5. The method according to claim 4, further comprising:
    obtaining a handover instruction sent by a source base station of the source cell, wherein the handover instruction contains the signal quality threshold.

6. The method according to claim 1, further comprising:
    releasing the resource configuration information of the source cell in response to a duration set by the first timer being expired.

7. The method according to claim 1, further comprising:
    stopping the first timer and releasing the resource configuration information of the source cell in response to success of the target cell handover.

8. A cell handover method, performed by a source base station which a source cell belongs to, comprising:
    performing a target cell handover and stopping data transmission between the source cell by a terminal;
    issuing a switching instruction to the terminal, wherein the switching instruction contains duration information of a first timer of the terminal; wherein a duration of saving resource configuration information of the source cell is determined by the terminal using the first timer; and
    starting a second timer and saving context of the terminal.

9. The method according to claim 8, further comprising:
    releasing the context of the terminal when a duration set by the second timer has expired.

10. The method according to claim 8, further comprising:
    issuing a switching instruction to the terminal, where the switching instruction contains a signal quality threshold; and
    determining whether to restore the data transmission between the target cell and the source cell by the terminal based on the signal quality threshold.

11. A cell handover apparatus, applied to a terminal, comprising:
a processor;
a memory configured to store executable instructions of the processor; wherein,
the processor is configured to:
obtain a handover instruction sent by a source base station which a source cell belongs to, wherein the handover instruction contains duration information of a first timer of the terminal;
perform a target cell handover and stop data transmission between and the source cell;
start the first timer when performing the target cell handover, wherein the first timer is configured to determine a duration of saving resource configuration information of the source cell; and
save the resource configuration information of the source cell using the first timer.

12. The apparatus according to claim 11, wherein the processor is configured to restore the data transmission between the target cell and the source cell by using resource configuration information of the source cell in response to failure of the target cell handover.

13. The apparatus according to claim 11, wherein the processor is configured to confirm that a duration set by the first timer has not expired and a signal quality of the source cell is greater than a signal quality threshold before restoring the data transmission between the target cell and the source cell using the resource configuration information of the source cell.

14. The apparatus according to claim 11, wherein the processor is configured to release the resource configuration information of the source cell in response to a duration set by the first timer being expired.

15. The apparatus according to claim 11, wherein the processor is configured to stop the first timer and release the resource configuration information of the source cell in response to success of the target cell handover.

* * * * *